(12) United States Patent
O'Toole

(10) Patent No.: US 11,781,532 B2
(45) Date of Patent: Oct. 10, 2023

(54) SMA MATERIAL PERFORMANCE BOOST FOR USE IN AN ENERGY RECOVERY DEVICE

(71) Applicant: Exergyn Limited, Dublin (IE)

(72) Inventor: Kevin O'Toole, Dublin (IE)

(73) Assignee: Exergyn Limited, Dublin (IE)

( * ) Notice: Subject to any disclaimer, the term of this patent is extended or adjusted under 35 U.S.C. 154(b) by 0 days.

(21) Appl. No.: 17/554,472

(22) Filed: Dec. 17, 2021

(65) Prior Publication Data
US 2022/0106943 A1  Apr. 7, 2022

Related U.S. Application Data

(63) Continuation-in-part of application No. 16/623,084, filed as application No. PCT/EP2018/065908 on Jun. 14, 2018, now abandoned.

(30) Foreign Application Priority Data

Jun. 16, 2017 (GB) .................................... 1709594

(51) Int. Cl.
  *F03G 7/06* (2006.01)
  *F03G 1/00* (2006.01)
  *F02B 73/00* (2006.01)

(52) U.S. Cl.
  CPC ............ *F03G 7/0614* (2021.08); *F02B 73/00* (2013.01); *F03G 1/00* (2013.01)

(58) Field of Classification Search
  CPC ............ F03G 7/065; G01K 5/483; G12B 1/00
  See application file for complete search history.

(56) References Cited

U.S. PATENT DOCUMENTS

| | | | | |
|---|---|---|---|---|
| 2004/0112049 A1* | 6/2004 | Behrens | .................. | F03G 7/065 60/527 |
| 2006/0260534 A1* | 11/2006 | Petrakis | .................... | G01K 1/02 374/E1.002 |
| 2008/0034749 A1* | 2/2008 | Ukpai | ..................... | H02N 2/101 60/527 |
| 2010/0243077 A1* | 9/2010 | Grimseth | .............. | F16K 31/025 60/527 |
| 2011/0120116 A1* | 5/2011 | Alexander | .............. | F03G 7/065 60/527 |
| 2012/0216523 A1* | 8/2012 | Browne | .................. | F03G 7/065 60/527 |

(Continued)

FOREIGN PATENT DOCUMENTS

| | | |
|---|---|---|
| WO | 2014198955 A1 | 12/2014 |
| WO | 2016097214 A1 | 6/2016 |
| WO | WO-2016097214 A1 * | 6/2016 ............. F03G 7/065 |

*Primary Examiner* — Shafiq Mian
(74) *Attorney, Agent, or Firm* — Occhiuti & Rohlicek LLP

(57) ABSTRACT

An energy-recovery device comprises an engine, an immersion chamber, a drive, and a power module. The engine comprises a core comprising a core element that comprises working material, the core element comprising a fixed first end and a second end that is connected to the drive. The immersion chamber houses the engine and is configured to be sequentially filled with fluid to expand and contract the core element. The power module applies a controlled stress to the core element during at least one of a heating phase and a cooling phase of a power cycle carried out by the engine.

20 Claims, 6 Drawing Sheets

(56) References Cited

U.S. PATENT DOCUMENTS

2013/0098029 A1\* 4/2013 Pinto, IV ................ F04B 19/22
 60/527
2014/0320276 A1\* 10/2014 Maschmeyer .......... H01L 41/09
 340/407.2

\* cited by examiner

SMA MATERIAL PERFORMANCE BOOST FOR USE IN AN ENERGY RECOVERY DEVICE

RELATED APPLICATIONS

This application is a continuation-in-part of U.S. application Ser. No. 16/623,084, filed on Dec. 16, 2019, which was the national phase of international application PCT/EP2018/065908, filed on Jun. 14, 2018, which claims the benefit of the Jun. 16, 2017 priority date of U.K. application 1709594.4, the contents of which are herein incorporated by reference.

FIELD OF INVENTION

The present application relates to the field of energy recovery and in particular to the use of Shape-Memory Alloys (SMAs) or Negative Thermal Expansion (NTE) materials.

BACKGROUND

Many industrial processes produce low-grade heat as a byproduct. This heat is typically less than 100° F. As such, it is difficult to harness for performing useful work. This low-grade is thus a significant waste energy stream in industrial processes, power generation and transport applications. Recovery and re-use of such waste streams is desirable.

An apparatus that carries out such recovery is described in U.S. Pat. No. 9,885,344, which issued on Feb. 6, 2018, the contents of which are herein incorporated by reference.

SUMMARY

It is therefore an object to provide an improved system and method for generating a larger power output from a shape-memory alloy or negative-thermal-expansion engine core for use in an energy recovery device.

In one aspect, the invention features an energy-recovery device that comprises an engine, an immersion chamber, a drive, and a power module. The engine comprises a core comprising a core element that comprises working material, the core element comprising a fixed first end and a second end that is connected to the drive. The immersion chamber houses the engine and is configured to be sequentially filled with fluid to expand and contract the core element. The the power module applies a controlled stress to the core element during at least one of a heating phase and a cooling phase of a power cycle carried out by the engine.

In another aspect, the invention features a method for energy recovery that includes arranging an elongated core element in an immersion chamber, the core element extending between a first end and a second end and comprising a working material, the core elements being fixed at the first end and connected to a drive mechanism at the second end, the working material being one of shape-memory alloy and negative-thermal-expansion material, filling the chamber with working fluid, thereby causing a power cycle that comprises a heating phase and a cooling phase for causing expansion and contraction of the core element, and applying a controlled stress to the core element during the cooling phase of the power cycle.

According to the present invention there is provided, as set out in the appended claims, an energy recovery device comprising: an engine comprising a plurality of elongated Shape Memory Alloy (SMA) elements or Negative Thermal Expansion (NTE) elements fixed at a first end and connected at a second end to a drive mechanism; an immersion chamber adapted for housing the engine and adapted to be sequentially filled with fluid to allow a heating cycle and a cooling cycle of the SMA elements to expand and contract the SMA elements; and a stress is applied to at least one of the SMA elements during the cooling and heating cycles.

The invention solves the problem of limited wire elongation associated with shape memory alloy or negative-thermal-expansion material, due to, but not limited at a multitude of limiting factors as finite reservoirs of temperature (limited potential in the hot and cold sources), limited amount of recovered strain in certain alloy formulations, a limited amount of available cycle time in order to obtain the targeted power output etc. These limitations of the amount of wire strain available for recovery during the power stroke means a limitation is put on the power output. By elongating the wire further during the cooling/relaxation stroke, the amount of strain available for recovery is increased resulting in an increase in net power output from the SMA cycle.

In one embodiment the invention provides a system and method to obtain an enhanced deformation in the cold martensitic state by applying a small load to return the material to an elongated state. Once the material is fully cold and elongated, more load is applied in at least a stage to enhance that initial elongation. The subsequent applied loads are greater than the initial load. In this way the deformation that the material is capable of is magnified in a controlled way that is not detrimental to the fatigue life.

Increasing the stroke length of the wires during the power stroke has secondary benefits, such as reducing the stress per wire, which is good for fatigue life. In addition the invention allows decreasing the quantity of wires in a bundle/core engine for the equivalent power output, which reduces costs in manufacturing.

In one embodiment the applied stress elongates the at least one SMA element further during the cooling cycle.

In one embodiment elongating said SMA element increases the amount of strain available for recovery resulting in an increase in net power output from a power cycle.

In one embodiment the power module is configured to store a small quantity of power produced during the heating cycle and feedback the power to the cooling cycle to increase the stress on the SMA elements.

In one embodiment the power module is configured to apply a controlled stress.

In one embodiment the power module is configured to gradually apply the stress in increased and controlled steps during the cooling cycle.

In one embodiment increased steps of applied stress ensures maximum element elongation during said cooling phase.

In one embodiment applied stress can be powered from energy produced in a previous power cycle.

In one embodiment the applied stress used in the elongation of the element during the cooling phase is less than a stress applied during the heating component of the heating phase.

In one embodiment the plurality of Shape Memory Alloy (SMAs) or Negative Thermal Expansion (NTE) elements are arranged as a plurality of wires positioned substantially parallel with each other to define a core.

In another embodiment there is provided an energy recovery device comprising: an engine comprising a plurality of elongated Shape Memory Alloy (SMA) elements or Negative Thermal Expansion (NTE) elements fixed at a first end and connected at a second end to a drive mechanism; an immersion chamber adapted for housing the engine and adapted to be sequentially filled with fluid to allow a heating cycle and a cooling cycle of the SMA elements to expand and contract the SMA elements; and a controlled stress is applied to at least one of the SMA elements during the cooling cycle.

In a further embodiment there is provided a method for energy recovery comprising the steps of: arranging a plurality of elongated Shape Memory Alloy (SMA) elements or Negative Thermal Expansion (NTE) elements fixed at a first end and connected at a second end to a drive mechanism; housing the elements in a chamber and sequentially filling with fluid to allow a heating cycle and a cooling cycle of the SMA elements to expand and contract the SMA elements; and applying a stress to at least one of the SMA elements during the cooling and/or heating cycles.

In one embodiment the applied stress elongates the at least one SMA element further during the cooling cycle.

In one embodiment elongating said SMA element increases the amount of strain available for recovery resulting in an increase in net power output from a power cycle.

In one embodiment there is provided the step of storing a small quantity of power produced during the heating cycle and feedback the power to the cooling cycle to increase the stress on the SMA elements.

In one embodiment there is provided the step of applying a controlled stress.

In one embodiment there is provided the step of gradually applying in increased and controlled steps during the cooling cycle.

In one embodiment the steps of increasing applied stress ensure maximum element elongation during said cooling phase.

In one embodiment there is provided the step of powering the applied stress from energy produced in a previous power cycle.

In one embodiment the applied stress used in the elongation of the element during the cooling phase is less than a stress applied during the heating component of the heating phase.

The invention is more advantageous than present technology as no other method to increase the work output for a particular SMA material exists.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION

The invention relates to the making of wires for use in a heat recovery system that can use either Shape Memory Alloys (SMAs) or other Negative Thermal Expansion materials (NTE) to generate a larger power output from a heated fluid.

Figure 1:
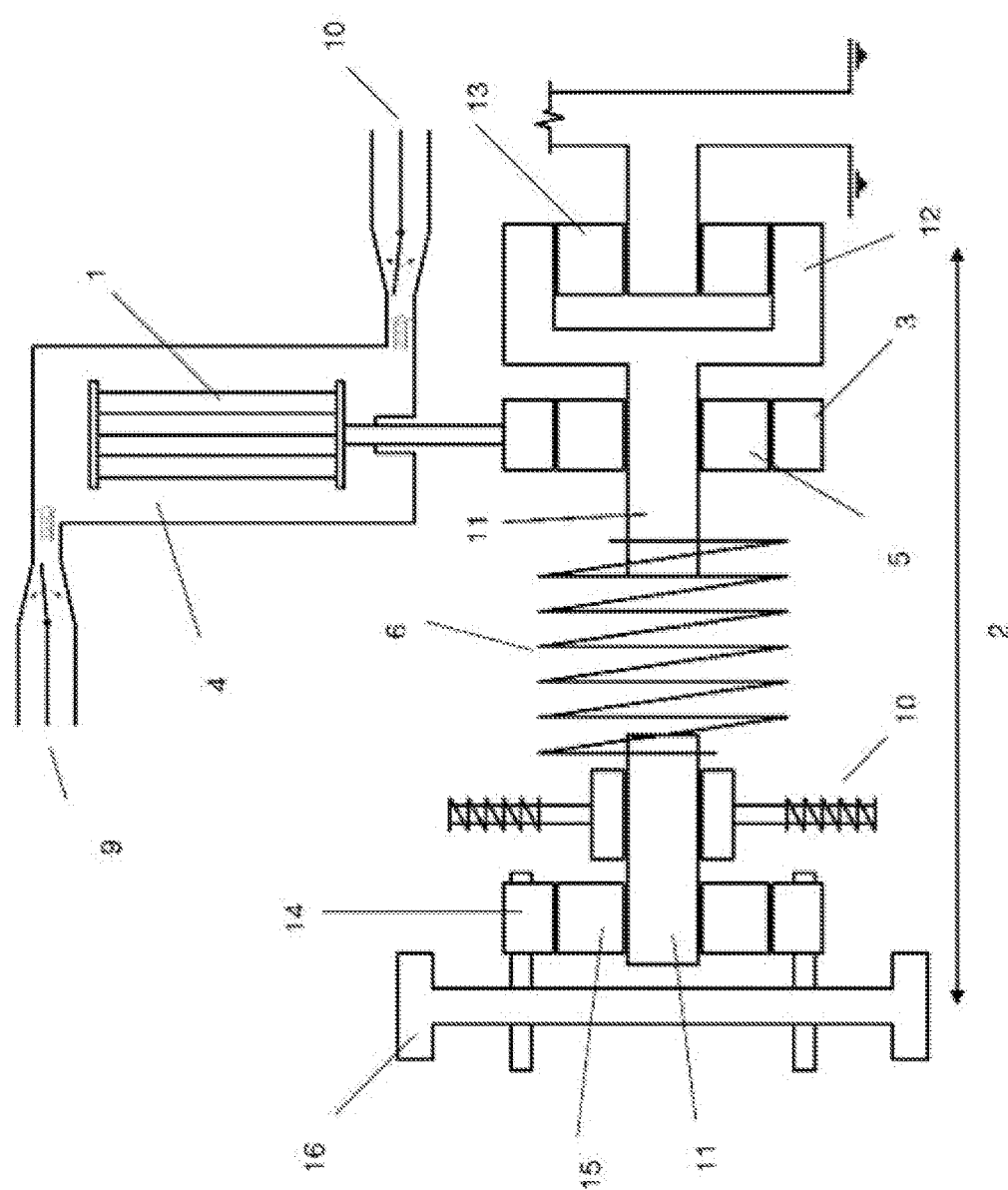
FIG. 1 illustrates an energy-recovery system.

FIG. 1 shows an engine 0 configured to recover, convert, store, and redeploy energy from low-grade heat sources by harnessing the shape-memory effect of certain alloys to generate a mechanical force. The illustrated engine 0 relies on the use of a working material, which is either a shape-memory-alloy or a negative thermal expansion material.

Within the engine 0 is an actuation core 1 that comprises the working material. The core's working material has been clamped or otherwise secured at a first point. This first point is fixed. At its opposing end, the working material has been clamped or otherwise secured to a drive mechanism 2. As a result, the first point is anchored, and the second point is free to move so as to pull on a drive mechanism 3.

An immersion chamber 4 houses the core 1. The chamber 4 is adapted to be sequentially filled with fluid to heat or cool the core 1. The core 1 contracts in response to being heated.

In some embodiments, the core 1 comprises a plurality of parallel wires, ribbons, or sheets of the working material. Typically, a deflection of around 4% is common for such a core 1. Accordingly, for a one-meter length of working material, one can expect a linear movement of about four centimeters. The force exerted depends on the mass of wire used. Accordingly, depending on the requirements of a particular configuration and the density of the working material, it is not unusual to have tens or hundreds of wires, ribbons, or sheets cooperating in a single actuation core 1.

A shaft that is attached to the actuation core's free end supplies linear mechanical movement and force to a one-way drive, or transmission. In the exemplary arrangement shown, the one-way drive comprises a ratcheted rack gear 4 driving a pinion gear 5. The pinion gear 5 is attached to and configured for winding an associated mainspring 6, which in the illustrated embodiment is a coiled spring 6. As an alternative to a spring 6, another mechanical-energy storage device is usable.

Upon being heated, the actuation core 1 contracts, thus causing the rack gear 4 to mesh with the pinion gear 5. This causes the pinion gear 5 to rotate.

As it rotates, the pinion gear 5 winds the mainspring 6. The spring 6 is sized to meet the requirements of a particular application. Industrial torsion springs are a good choice for the mainspring 6. Similarly, the rack-and-pinion arrangement is sized according to the particular application and the expected degree of movement from the actuation core 1.

The actuation core 1 contracts in response to heat applied to the immersion chamber 4. Following contraction, the heat is removed and the actuation core 1 allowed to cool, thus causing it to expand.

To ensure that the actuation core 1 expands all the way to its uncontracted state, it is useful to provide a bias spring to exert a longitudinal force that will bias the actuation core 1 back into its uncontracted state. This bias spring is much smaller than the mainspring 6.

In one embodiment the chamber 4 encloses the actuation core 1. The chamber 4 is adapted to be sequentially filled with hot and cold fluid, such as water, to fully immerse the actuation core 1. The actuation core 1 absorbs heat from the heated fluid when it passes through the chamber and thus contracts in response. It then releases heat to the cooler fluid when it passes through the chamber, thereby expanding in response. The liquid enters through an inlet 9 and exits through an outlet 10. By continuously cycling heated and cooled fluid through the chamber 4 in this way, it is possible to cyclically heat and cool the actuation core 1, thereby producing usable mechanical work from its periodic contraction and expansion. This mechanical work, which is harvested by multiple cycles of heating and cooling, enables the rack-and-pinion arrangement to incrementally wind the mainspring 6.

Immersive heating is preferable to heating via contact with a hot surface, such as the exterior of a heated pipe or other heated surface because immersion heating permits a significantly larger mass of working material to directly contact the heating fluid. This increases the unit's power density.

A first end of the mainspring 6 is connected to and wound by the pinion gear 5. A second end of the mainspring 6 connects to an output transmission shaft 11. The shaft is restrained from rotating by a release brake 10. Releasing the brake 10 releases energy stored in the mainspring 6 so that it can be used to rotate the output transmission shaft 11. As a result, each cycle recovers heat from a heat source, converts it into mechanical energy, stores that energy in the mainspring 6, and then releases it to turn the transmission shaft 11.

Moreover, since the mainspring 6 stores incremental amounts of energy with each cycle, it is possible to accumulate small boluses of recovered energy and then release the accumulated energy in a short time, thus increasing power output. This enables the recovered energy to carry out useful mechanical work.

In each cycle, after the contraction is complete, the heat source, i.e. hot fluid in immersion chamber 4 is removed through outlet 10 and the core 1 allowed to cool, either actively, by causing cool fluid to enter through the inlet 9, or passively. When the actuation core 1 has returned to its starting position, the heat source may again be applied, permitting the charging cycle to be repeated. In this manner, the mainspring 6 can be coiled much further than it could be coiled in any one cycle.

The heat-recovery device of FIG. 1 is particularly useful where low-grade heat is available and demand for power is intermittent. Examples of applications are for use in automotive power plant, in power generation systems or to recover heat from industrial processes. The heat recovery device may also be used for charging a flywheel-based uninterruptable power supply as an alternative to a battery because of its durability and long lifespan. For example, in server farms where significant amounts of heat are generated, energy might be recovered and used to provide an input drive to a flywheel-based uninterruptable power supply.

FIG. 1 shows a first clutch 3, 5, a second clutch 12, 13, and a third clutch 14, 15, all of which are one-way clutches.

The first clutch 3, 5, which promotes incremental charging of the mainspring 6 and its subsequent release, is driven by the actuation core 1 via a suitable pinion gear or connecting rod. This clutch 3, 5 is connected to the mainspring 6 via the transmission shaft 11 so that the rotation of the first clutch 3, 5 rotates the mainspring 6. This permits incremental energy storage in the mainspring 6.

The second clutch 12, 13 is positioned and connected in such a way as to prevent the reverse movement of the first clutch 3, 5. In some embodiments, the second clutch 12, 13 is implemented as a ratchet mechanism or a sprag clutch.

The third clutch 14, 15 connects to the first clutch 3, 5 via the mainspring 6. This third clutch 14, 15 is arranged in such a manner that an inner clutch race connects to the mainspring 6 and an outer race connects to an output shaft or flywheel 16. The third clutch's inner race is also arranged so that it may be held stationary using a brake.

In operation, the core's contraction rotates the first clutch 3, 5 by some amount. The second clutch 12, 13 rotates by the same amount. When the contraction is completed, both first and second clutches 3, 5, 12, 13 cease movement.

At this point, the core's contraction attempts to rotate the outer race of the first clutch 3, 5 back to its starting position. The second clutch prevents the inner race of the first clutch 3, 5 from rotating back, thereby maintaining the first clutch's position.

The inner race of first clutch 3, 5 connects to one end of the mainspring 6. The mainspring's opposite end connects to the inner race of the third clutch 14, 15. The brake 10 holds the inner race of the third clutch 14, 15 in place. Therefore, as the first clutch 3, 5 charges the mainspring 6, the third clutch 14, 15 restrains the mainspring 6. This allows the mainspring 6 to store energy contributed by the contraction of the core 1.

In addition, the ratcheting action of the second clutch 12, 13 means that the core 1 is able to rotate the first clutch 3, 5 many times in succession. In this manner, the mainspring 6 may be incrementally charged until a desired energy storage level has been achieved.

Releasing the brake 10 releases the energy stored in the mainspring 6. This allows the stored energy in the mainspring 6 to suddenly rotate the inner race of the third clutch 14, 15. The inner race in turn forces the outer race to rotate and thereby passes the energy stored in the mainspring 6 to the output shaft or flywheel 16.

Because the third clutch 14, 15 is also a one-way clutch, the outer race is free to maintain rotation, under the inertia of a flywheel even after the inner race has come to rest following depletion of the energy that was stored in the mainspring 6. This means that the inner race of third clutch 14, 15 may be braked and the charging process started once again even while the flywheel 16 continues to spin.

When due care is taken to correctly size the springs and to match the load, it is possible to have the engine 0 operate continuously or almost continuously instead of having to operate with a charge cycle and a delayed release cycle as described previously. This is achieved by matching the mainspring 6 to the load being driven such that discharging the mainspring 6 accelerates the load to an operating speed that exceeds the charging cycle speed of the actuation core 1. For example, a flywheel may be employed as the load or as a buffer load. In this manner, the mainspring 6 acts as a step-up transmission system.

By arranging a plurality of the cores 1 in either a series or parallel fashion as described above, it is possible to have periodic charging cycles operating in sequence, out of phase with each other. This is similar to the operating of pistons in a combustion engine.

For example, three cores 1 could be arranged to operate 120 degrees out of phase. In this matter, one or more mainsprings 6 might be charged by three charging pulses according to this phase difference. It is theoretically possible to have any number of cores 1 operating in such a manner, either evenly out of phase i.e., with equal gaps between each cycle, or unevenly out of phase, i.e., with varying phase differences between SMA cores.

The mainsprings 6 can likewise be discharged in such an out of phase manner by arranging the release mechanism to be timed in a way that allows such out-of-phase discharge of the mainspring 6 to the load. The pulses in the operation may be evened out by incorporating a flywheel at the mainspring's output.

In the foregoing device, the contraction of the working material on exposure to a heat source is captured and used to perform mechanical work. A useful material for the working material for such an engine 0 has been proven to be an alloy of nickel and titanium. However, any working material with similar response to heating and cooling is useful.

Force is generated through the contraction and expansion of the working material during a work cycle that includes a heating phase and a cooling phase within the actuation core 1. This force is transmitted through the transmission mechanism. The resulting engine 0 provides a reliable assembly is created that enables high force and low displacement mechanical work to be carried out over many working cycles.

Depending on the requirements of a particular configuration and the mass of working material needed, a plurality of substantially parallel wires made from the working material can be used together in a single core 1.

Figure 2:
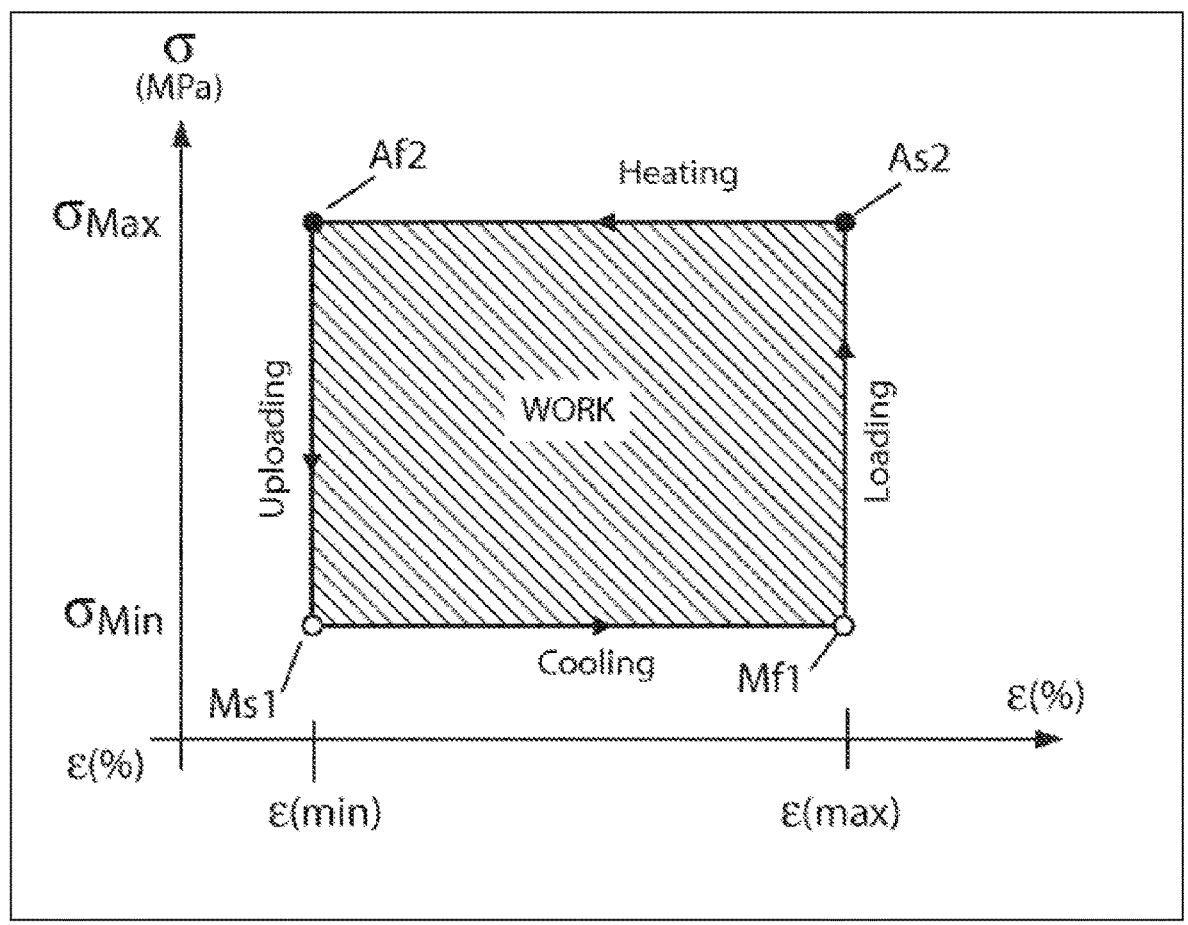
FIG. 2 illustrates a SMA material work cycle between a heating and cooling cycle.

FIG. 2 illustrates a work cycle that occurs during heating and cooling of the working material. The area of the closed curve thus formed is indicative of mechanical work that can be harvested in one cycle. It is therefore useful to increase this area.

In the method described herein, the mechanical work harvested per cycle is increased by maximizing the difference between stress applied to the wire during the heating part of the cycle and the lower stress applied during the cooling part of the cycle. The mechanical work that can be harvested from each such a cycle is a function of the relative difference between the high stress and low stress values and the recovered strain achieved during the contraction phase.

Figure 3:
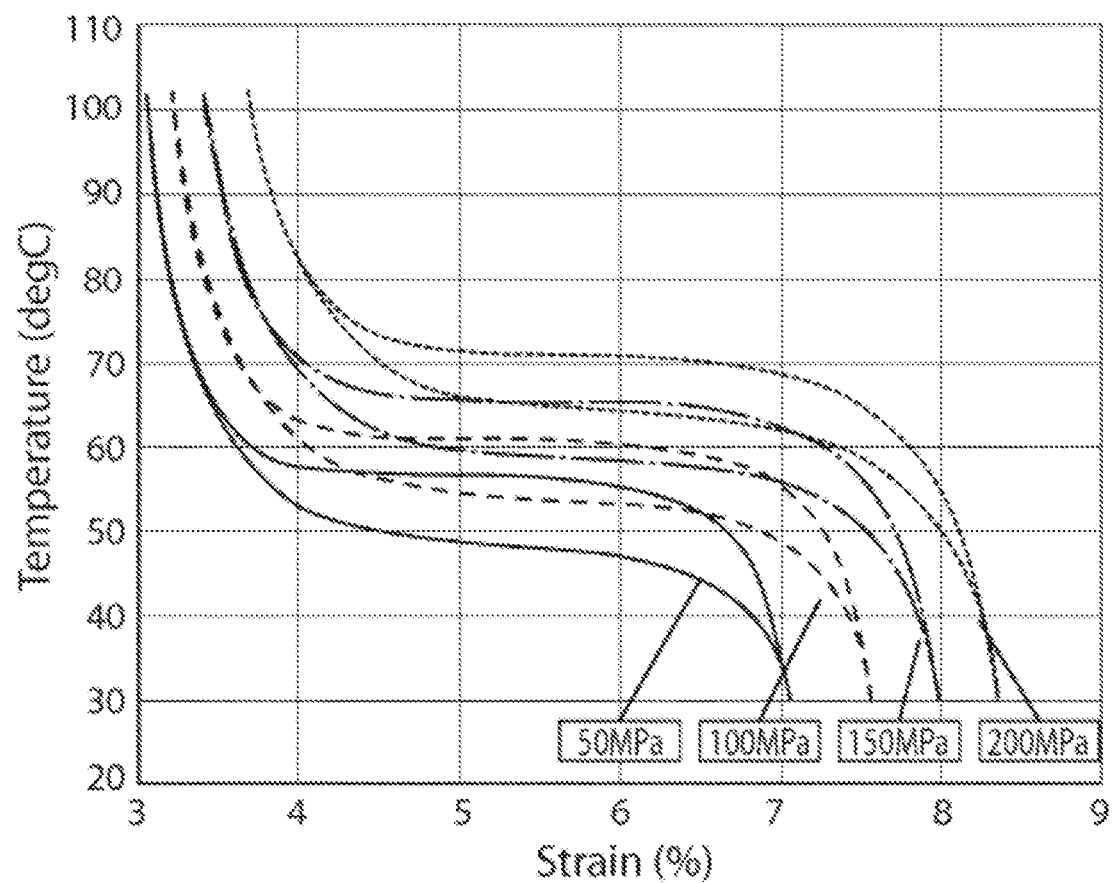
FIG. 3 illustrates a non-linear temperature-strain hysteresis for different stress levels applied to a SMA core.

FIG. 3 illustrates the non-linear temperature-strain hysteresis for different stress levels. It is apparent that the working material does not exhibit a static temperature-strain relationship under different stress values.

Figure 4:
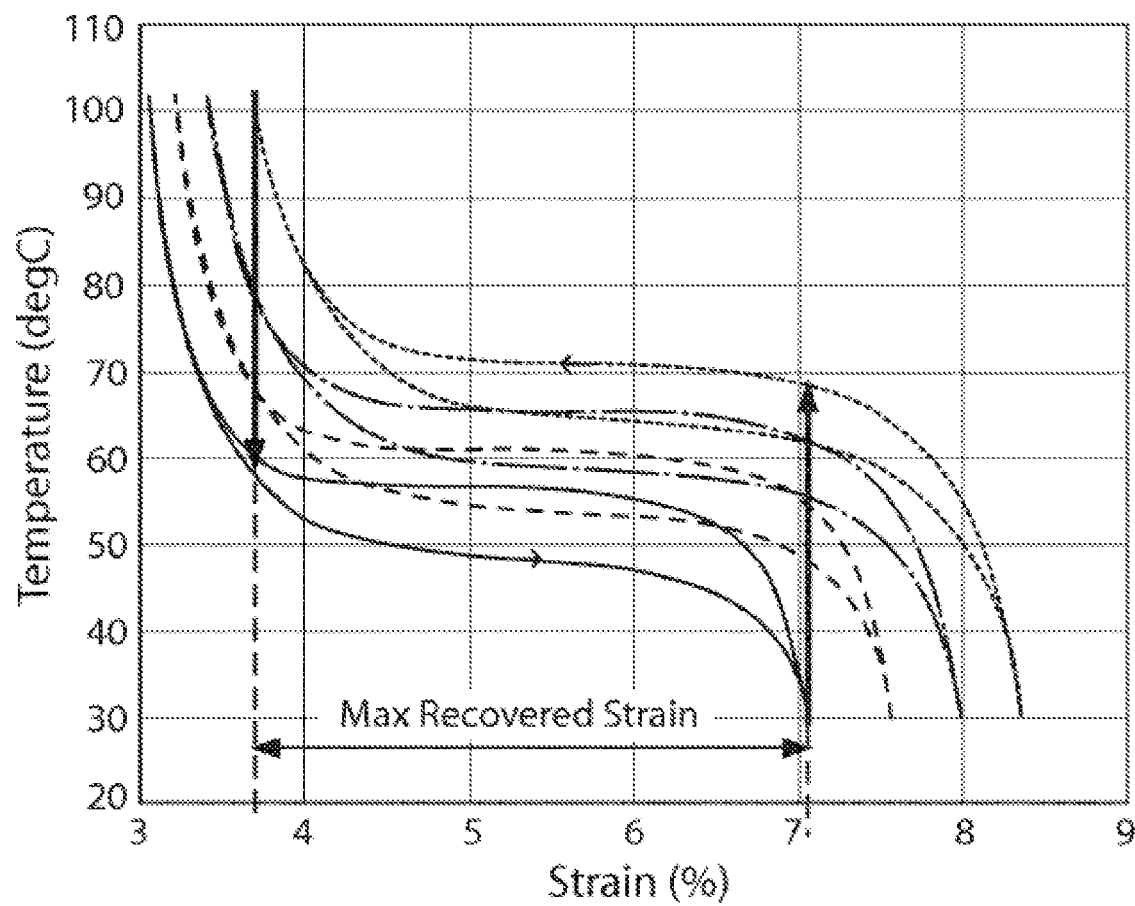
FIG. 4 illustrates a reduction in strain as a function of high stress and low stress cycle.

FIG. 4 illustrates a reduction in strain as a function of high stress low stress cycle. The strain on the working material is evidently reduced in a typical high stress/low stress application cycle as a result of the non-linear relationship. As is apparent from the figure, the high stress causes a contraction limitation, the value of which depends on the working material's properties. Meanwhile, the low stress results in a reduction in wire extension. This causes a maximum recovered strain that continues to decrease as higher levels of stress are applied during the working cycle.

In order to obtain a useful power output, the engine 0 has to work on a pressure differential. A stress can be applied during the heating and cooling cycles, with higher stress on the heating phase and lower stress on the cooling cycle. This results in a differential stress.

Referring back to FIG. 1, a power module 18 is configured to store a small quantity of power produced during the heating cycle and to feed this power back during the cooling cycle to increase the stress on the working material of the core 2.

The power module 18 provides loads the wires of working material in the core 2 by applying a force. In some embodiments, the force is provided by a hydraulic mechanism 20. Instead of having only one high pressure line and one low pressure line for normal engine operation, there will be several low-pressure lines increasing in load so as to promote an increase of elongation and stress in the working material. In other embodiments, the force is provided by a mechanical-or-tensioning mechanism 22.

In operation, the overall cycle comprises a heating phase and a cooling phase. The power module 18 extracts some of the mechanical work from the core 2 during the heating phase and inputs a small quantity of the work produced during the cooling phase. This increases the elongation or strain experienced by the working material in the core. The extent of such applied stress during the cooling phase is greater than that experienced by the working material during a constant low stress application. The power module 18 relies on a mechanical or tensioning mechanism to control stress applied to the working material in the core 2 during the cooling phase.

The power module 18 is configured to gradually apply the stress in increased and controlled steps during the cooling phase. It does so by gradually ratcheting up the low stress level once the wire/wire bundle elongation has been achieved for a particular low stress. This ensures the achievement of the maximum amount of wire elongation under the lower stress value before the power module 18 applies the next stress step.

For example, if a stress of 10 MPa achieves a gross wire elongation of 1%, and a stress application of 20 MPa achieves a gross wire elongation of 1.5%, it is critically important to achieve the 1% elongation under 10 MPa before applying the 20 MPa stress level to achieve the additional 0.5% of elongation.

The positive net benefit in terms of work produced remains positive as long as the stress values used in the elongation of the wire are less than the stress applied during the heating phase, which recovers this "stretch." The net power/work output will be proportionally reduced for every additional stretch of the wire as the stress required to stretch will be increased, meaning the stress difference for extension to contraction is reduced.

Figure 5:
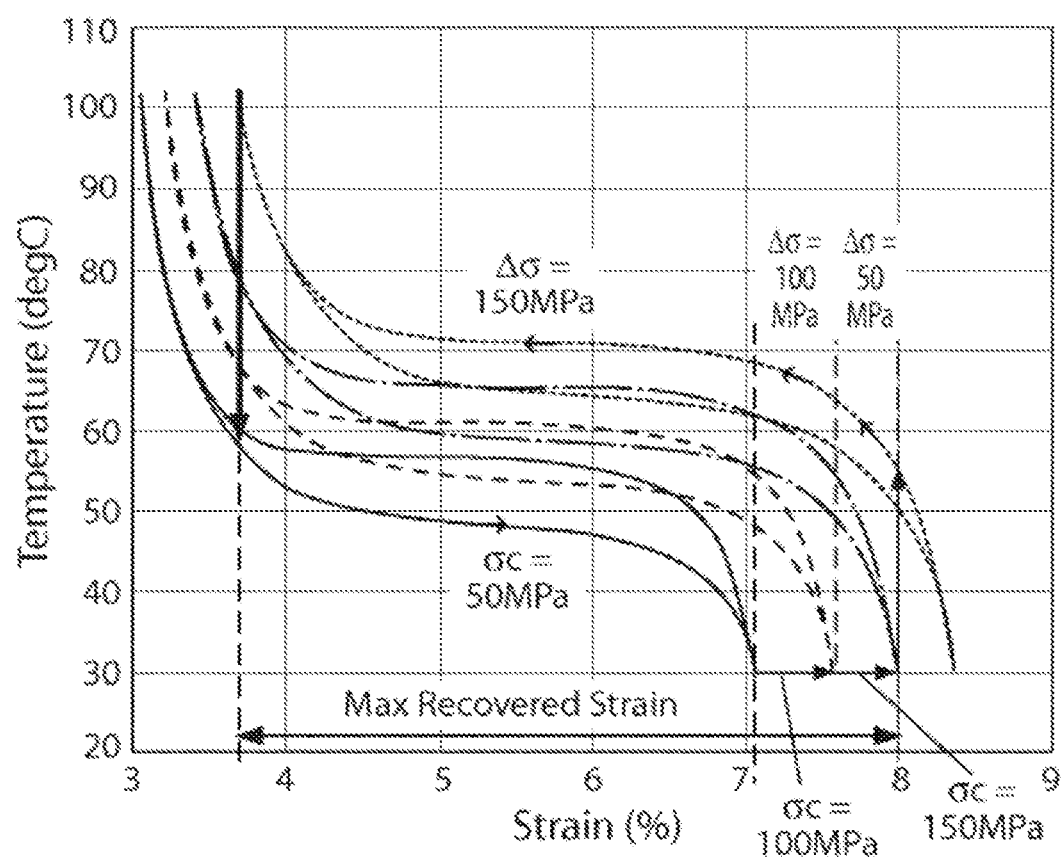
FIG. 5 illustrates an example of SMA boosting for the SMA elements on a Temperature-Strain plane showing increased efficiency.

FIG. 5 illustrates an example of shape-memory alloy boosting for shape-memory alloy elements on a Temperature-Strain plane showing increased efficiency. In the particular example, two stretches are achieved using 100 MPa and 150 MPa (shown as $\sigma_c$). The difference in stress, $\Delta\sigma$, during the heating recovery cycle can be calculated to be 100 MPa and 50 MPa, respectively.

Figure 6:
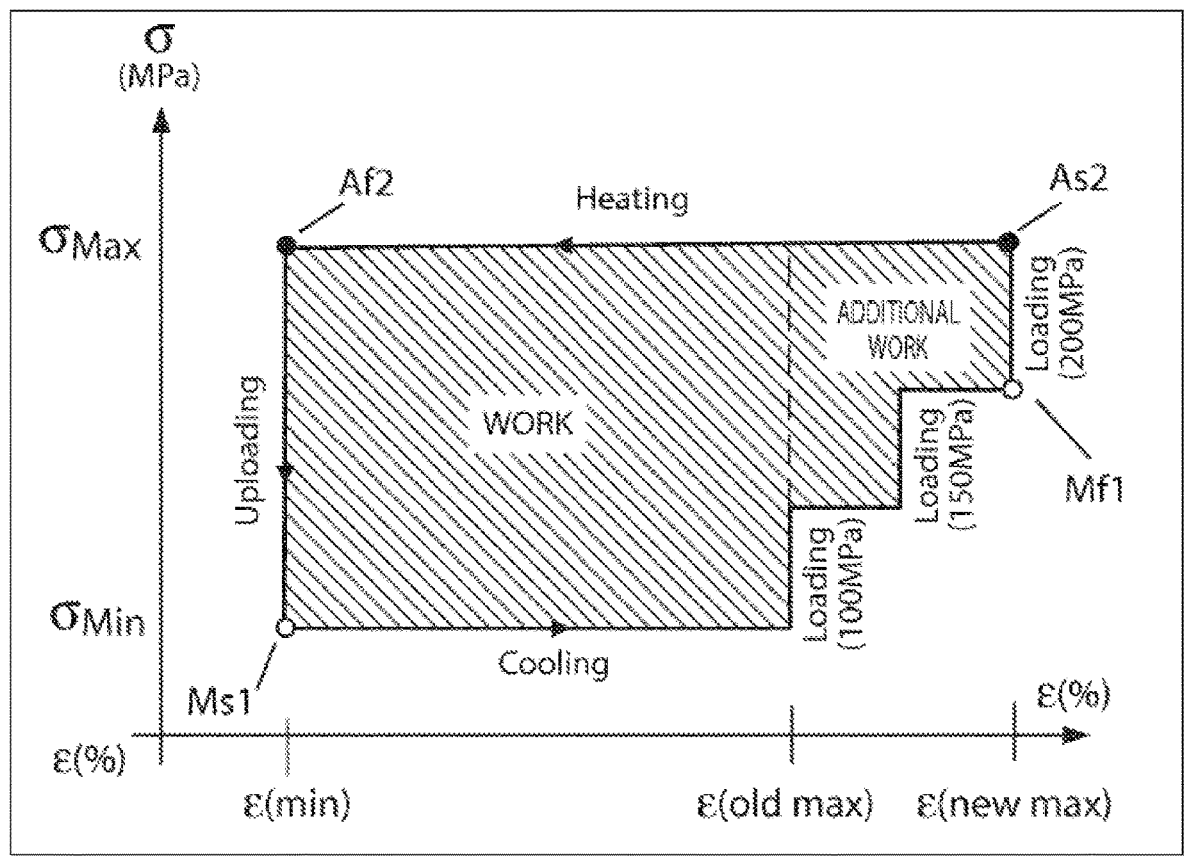
FIG. 6 illustrates the same effect of the approach shown in FIG. 4 on the stress-strain plane.

FIG. 6, when compared with FIG. 2, shows the same effect of the approach in which the power module 18 applies additional stress. The stepped approach, in which the power module 18 applies controlled amounts of stress during the cooling phase, is readily apparent in the figure. This working material boost provided by the power module 18 results in additional work above and beyond that which would have resulted absent the power module 18.

It is also important to take note of the time required to carry out the stretching of the wires in the core 2. This time determines determine the input power requirement. The required time can be controlled by selecting the type of the working material and the number of working-material elements in the core 2. It is important to ensure that this is lower than the potential increase in power output achieved using the performance boosting carried out by the power module 18.

Having described the invention and a preferred embodiment thereof, what is claimed as new and secured by letters patent is:

1. An apparatus comprising energy-recovery device, said energy-recovery device comprising
   an engine, an immersion chamber, a drive, and a power module,
   wherein said engine comprises a core comprising a core element that comprises working material, said core element comprising a fixed first end and a second end that is connected to said drive, wherein said immersion chamber houses said engine and is configured to be sequentially filled with fluid to expand and contract said core element, and wherein said power module applies a controlled stress to said core element during a cooling phase of a power cycle carried out by said engine.

2. The apparatus of claim 1, wherein said power module is configured to apply a stress that causes an additional elongation of said core element during said cooling phase of said power cycle.

3. The apparatus of claim 1, wherein said power module is configured to increase strain available for recovery in said core element during said cooling phase to thereby increase net power output from a power cycle.

4. The apparatus of claim 1, wherein said power module is configured to store energy from power produced during a heating phase of said power cycle and to feed said energy back for use as power for increasing stress on said core element during said cooling phase of said power cycle.

5. The apparatus of claim 1, wherein said power module comprises a hydraulic mechanism to apply said controlled stress during said cooling phase of said power cycle.

6. The apparatus of claim 1, wherein said power module comprises a mechanical or tensioning mechanism to apply said controlled stress during said cooling phase of said power cycle.

7. The apparatus of claim 1, wherein said power cycle is a first power cycle, wherein controlled stress that is applied by said power module during a particular power cycle is applied using energy produced in a second power cycle, and wherein said second power cycle occurred before said first power cycle.

8. The apparatus of claim 1, wherein said power module is configured to apply a controlled stress to elongate said core element during said cooling phase of said power cycle and wherein said controlled stress is less than a stress applied to said core element during a said heating phase of said power cycle.

9. The apparatus of claim 1, wherein said core element is one of a plurality of identical core elements that are parallel to each other and that collectively define said core.

10. The apparatus of claim 1, wherein said working material comprises shape memory alloy.

11. The apparatus of claim 1, wherein said working material comprises a negative thermal expansion material.

12. A method for energy recovery, said method comprising arranging an elongated core element in an immersion chamber, said core element extending between a first end and a second end and comprising a working material, said core element being fixed at said first end and connected to a drive mechanism at said second end, said working material being one of shape-memory alloy and negative-thermal-expansion material, filling said chamber with working fluid, thereby causing a power cycle that comprises a heating phase and a cooling phase for causing expansion and contraction of said core element, and applying a controlled stress to said core element during said cooling phase of said power cycle.

13. The method of claim 12, further comprising applying said controlled stress after said core element has finished elongation during said cooling phase, thereby causing additional elongation of said core element.

14. The method of claim 12, further comprising elongating said core element during said cooling phase.

15. The method of claim 12, wherein elongating said core element increases the amount of strain available for recovery resulting in an increase in net power output from a power cycle.

16. The method of claim 12, further comprising storing energy from said heating phase, wherein applying said controlled stress comprises feeding said energy back during said cooling phase to apply said controlled stress to said core element.

17. The method of claim 12, wherein applying said controlled stress comprises controlling a hydraulic mechanism.

18. The method of claim 12, wherein applying said controlled stress comprises increasing said controlled stress in steps during said cooling phase.

19. The method of claim 12, wherein applying said controlled stress comprises using energy produced from a previous power cycle to cause said stress.

20. The method of claim 12, wherein applying said controlled stress comprises controlling said stress applied to elongate said core element during said cold phase is less than a stress applied during said heating phase.

* * * * *